July 25, 1939.  W. F. HEROLD  2,167,508
TILTING MECHANISM, ESPECIALLY FOR CHAIRS
Filed Jan. 31, 1936
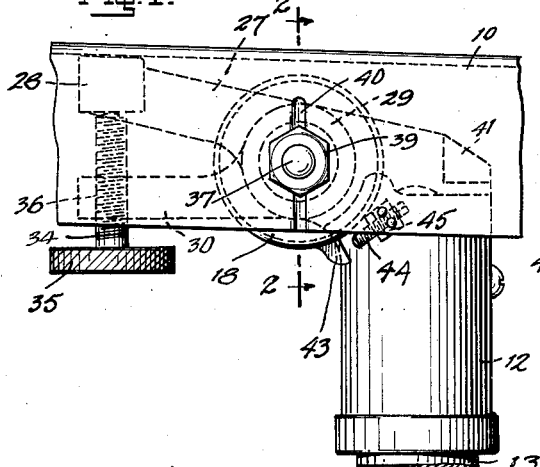
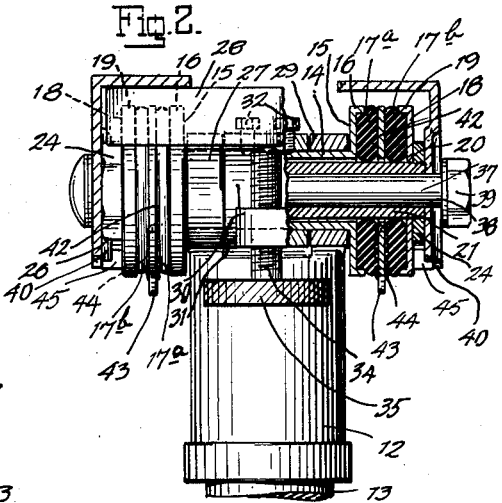
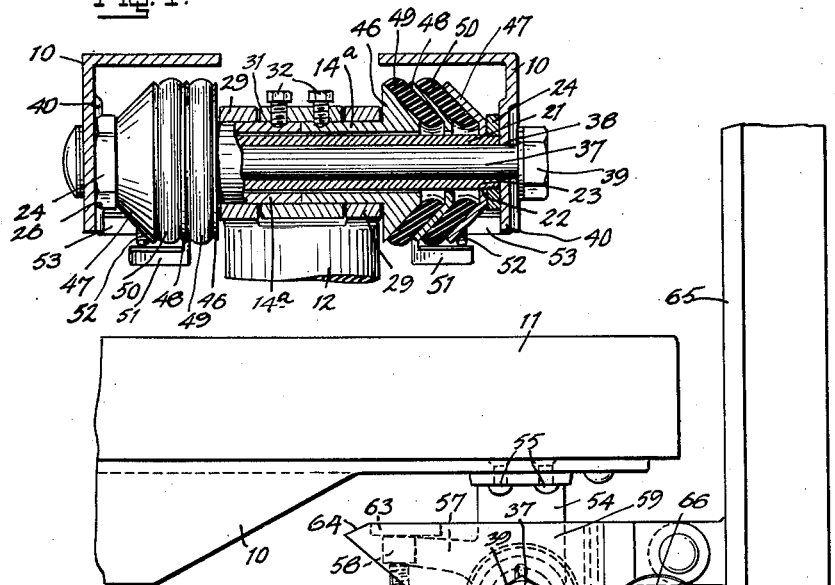
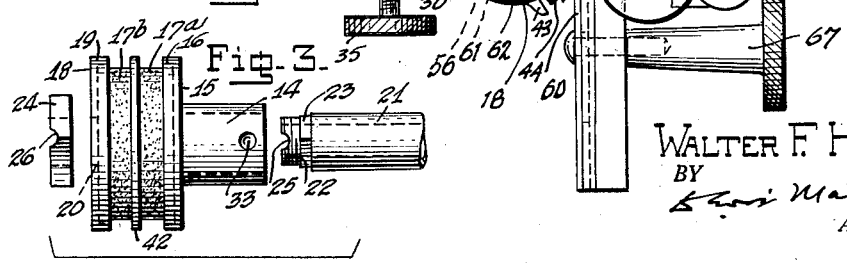
INVENTOR.
WALTER F. HEROLD.
BY
ATTORNEY.

Patented July 25, 1939

2,167,508

UNITED STATES PATENT OFFICE 2,167,508

TILTING MECHANISM, ESPECIALLY FOR CHAIRS

Walter F. Herold, Bridgeport, Conn., assignor to The Bassick Company, Bridgeport, Conn., a corporation of Connecticut Application January 31, 1936, Serial No. 61,833

2 Claims. (Cl. 287—85)

The present invention relates to tilting mechanism, especially for chair irons, either of the type in which the chair seat is tiltable relatively to a supporting base, or in which the chair back is tiltable relatively to the chair seat, and is an improvement over the chair iron disclosed in my U. S. Letters Patent for Chair iron, No. 2,008,209, granted July 16, 1935 and in which the tilting action takes place in a hinged joint of rubber or other suitable material in the form of cylindrical tubular body of rubber disposed under permanent pressure and tension between inner and outer co-axial concentric cylindrical members to which the rubber is in effect bonded, relative turning movement between these members causing torsional strain to be set up in the rubber body.

According to the invention described in said patent the hinged joint is usually formed by vulcanizing the cylindrical body of rubber upon an inner cylindrical member and then forcing the rubber into an outer cylindrical tubular member, the body of rubber being substantially greater in diameter and shorter in length prior to insertion in the outer tubular member than after insertion, the great pressure under which the deformed member is confined within the outer tubular member causing it to engage the inner surface of the outer cylindrical member with such great pressure that a frictional resistance is set up which upon relative turning movement between the inner and outer members is sufficient to cause the confined rubber to adhere to the outer cylindrical member.

It is proposed in the present invention to provide a hinge joint in which the rubber is pressed into a distorted shape between a pair of plate-like members arranged in spaced relation longitudinally of the axis of rotation between the members, this arrangement permitting the rubber in its undistorted state to be vulcanized to both members if desired whereas in the type of joint described in my aforesaid patent this is impractical because vulcanization to the outer cylindrical member would have to take place after insertion and distortion of the rubber within the outer member and the vulcanization under these conditions would destroy or impair the elasticity of the distorted rubber.

A further object of my invention is to provide a joint which may be conveniently assembled in the chair and in which the rubber may be conveniently confined in its distorted relation during the assembling of the various parts of the structure. A further object is to provide a structure in which the rubber may be confined in its distorted state by pressure means forming part of the joint and which have screw-threaded engagement therewith, whereby the same may be confined merely by turning said pressure means, whereas in the type of joint described in my aforesaid patent it is necessary to assemble the inner and outer members of the joint and the rubber body by means of a high powered press.

A further object is to provide a hinge joint in which a plurality of rubber members are employed and which may be arranged to have varying resistance, to the end that the tilting member of the chair may have an easier tilting action within a certain limit of the tilting range.

A further object is to provide a hinge joint in which a plurality of rubber members are pressed between plate or disk members in spaced relation longitudinally of the axis of relative rotation, and are arranged so that one of the members will be tensioned during the tilting action over a predetermined limited range of tilt while tension upon the other rubber member will be applied throughout the full range of tilt. This joint is capable of easy tilting and the necessary support under a wide range of weight and strain conditions, so that the chair equipped therewith may be capable of supporting persons of widely different weights and builds.

With the above and other objects in view embodiments of the invention are shown in the accompanying drawing and these embodiments will be hereinafter more fully described with reference thereto, and the invention will be finally pointed out in the claims.

In the drawing:

Fig. 1 is a side elevation of a chair iron embodying the invention, the forward and rearward ends of the seat supporting spider arms being broken away.

Fig. 2 is a view partially in front elevation, and partially in vertical section along the line 2—2 of Fig. 1.

Fig. 3 is a plan view showing one end of the spindle and the joint element parts in separated relation.

Fig. 4 is a view partially in front elevation and partially in vertical section of a modified form of the invention.

Fig. 5 is a side elevation of a chair structure in which the back is tiltable relatively to the seat and embodying the invention.

Similar reference characters indicate corresponding parts throughout the several figures of the drawing.

Referring to the drawing and more particularly to Figs. 1 to 3 thereof, the chair iron, according to the illustrated exemplary embodiment of the invention shown therein, comprises a pair of angular cross-section spider arms 10—10 adapted to be screwed to the under side of the chair seat in the usual manner, and mounted for tilting movement on a bracket 12 having a vertically disposed socket therein in which is engaged a vertically disposed post or spindle 13, the bracket having swivel movement on the post.

The tiltable mounting of the spider arms is effected by securing one part of the joint element to the bracket and the other part to the spider arms, the resilient rubber support being operatively disposed between these parts, as will presently more fully appear.

The joint element comprises a pair of cylindrical tubular members 14—14 of similar form and disposed in opposed relation to each other, each being provided at its outer ends with a flange 15 having a flanged lip 16 at its periphery. A pair of cylindrical tubular members 17ª and 17ᵇ separated by a centrally apertured disc 42 to which the rubber members are preferably vulcanized prior to being pressed into assembled relation are disposed between the flange 15 and a plate or disk member 18 at each end of the joint element, each of the plate members 18 having a flanged lip 19 at its periphery and provided centrally with a hexagonally shaped aperture 20. The rubber members 17ª and 17ᵇ are preferably also respectively vulcanized to the flange 15 and plate member 18. The members 17ª and 17ᵇ are shown in their state prior to being pressed into their operative distorted state as shown in Fig. 3 are substantially longer in an axial direction and of less thickness or diameter than in the distorted state. A tubular spindle 21 is provided at each end with a threaded portion 22, and adjacent each of these threaded portions is provided with a hexagonal shoulder 23, the latter adapted in the assembled relation of the joint element to interlockingly fit into central apertures 20—20 of the plate members 18—18 so as to make the plate members rigid with the spindle. The joint element is assembled by engaging the tubular members 14—14, together with the rubber members 17ª—17ª and 17ᵇ—17ᵇ, the separator discs 42—42 and the end plates 18—18 upon the spindle 21 and thereupon pressing the plate members 18—18 inwardly to distort the rubber members, the plates 18—18 being tightly pressed toward each other by means of nuts 24—24 engaged upon the threaded ends 22—22 of the spindle 21. The ends of the spindle 21 are provided with grooves 25 of semi-circular cross-section, and the nuts 24—24 are similarly provided with grooves 26, which in the assembled relation as shown in Fig. 6 register with the grooves 25. These grooves provide for the interlocking engagement of the spindle 21 with the spider arms, as will presently more fully appear.

It will be observed that in the distorted state of the rubber members 17ª and 17ᵇ as shown in Fig. 2 they bulge out slightly between the flanged lips 16 and 19 at their outer peripheries and at their inner peripheries are bulged toward the spindle 21. The outside diameter of the spindle 21 is slightly less than the inside diameter of the tubular members 14—14, as well as of the apertures of the separator disks 42—42 so that the spindle is supported in spaced concentric relation within the tubular members and the separator discs by the rubber members 17ª and 17ᵇ in such manner that there is no metal to metal contact between the relatively rotatable metal parts of the joint element.

The bracket 12 is provided with a forwardly projecting yoke portion 27 having a transverse connecting bridge portion 28 at its forward end, against which the upper portions of the spider arms 10 are adapted to rest in the normal non-tilted position of the chair seat. The yoke portion is provided in each side with bearing openings 29—29 in which the tubular members 14—14 of the joint element are engaged for rotary movement as will presently more fully appear.

Within the space between the sides of the yoke portion a tension applying and adjustment lever 30 is disposed, its collar portion 31 being engaged about the adjacent inner end portions of the tubular members 14—14 of the joint element and rigidly secured thereto by set screws 32—32 in the collar engaging recesses 33—33 provided in the tubular members 14—14. An adjusting screw 34 having a hand wheel or nut 35 at its end is engaged in a threaded opening 36 in the end of the lever 30 and is adapted to bear at its upper end upon the under side of the bridge portion 28.

The joint element is assembled with the spider arms by means of a tie-bolt 37 headed at one end and screw threaded at the other end and engaged through apertures 38—38 in the sides of spider arms and through the tubular spindle 21, the head of the tie-bolt engaging the outer surface of one of the spider arms and the nut 39 screwed upon the screw-threaded end engaging the outer surface of the other spider arm. For the purpose of rigidly connecting the spindle 21 to the spider arms against rotary movement the spider arms are provided with inwardly embossed vertically extending ribs 40—40 extending above and below the bolt receiving apertures 38—38, these ribs being engaged in the grooves 25—25 and 26—26 in the ends of the spindle 21 and the nuts 24—24.

It will be obvious that by adjusting the screw 34 the tubular members 14—14 of the joint element and their flanges 15—15 are rotated with respect to the bearing portions 29—29 of the bracket 12 and through the torsional strain imposed upon the rubber members 17ª and 17ᵇ any desired initial tension may be set up in the latter for the purpose of causing the spider arms to tilt in counterclockwise direction against the bridge portion 28, the greater the initial tension the more force required to tilt the spider arms in clockwise direction. The bracket 12 is provided in rearwardly spaced relation to the bearing portions 29—29 with outwardly projecting limit stop portions 41—41 having inclined upper surfaces and which are adapted to be engaged by the upper portions of the spider arms at the rearward limit of tilt.

Each of the disks 42 is provided with a projecting lug 43 disposed in the path of an adjustably mounted stop screw 44 mounted in a bracket 45 secured to the spider arm, this screw being adjustable toward or away from the lug 42. The relative position of the stop screws 44—44 and the lugs 43—43 determines the extent of the initial tilting range, the joint element having an initial tilting range during which the rubber members 17ª—17ª and 17ᵇ—17ᵇ are torsionally twisted and a secondary tilting range during which only the rubber members 17ª—17ª are torsionally twisted. This is brought about through the engagement of the lugs 43 with the stop screws 44 at the end of the initial tilting range, so that during the secondary tilting range the disks 42—42 move with the plates 18—18 and no further tension is applied to the rubber members 17b—17b. The tension of the rubber members may be so regulated that during the initial tilting range the joint will operate with comparative ease, while during the secondary tilting range the resistance will be considerably increased, so that the device may be made to properly accommodate any desired amount or disposition of weight.

In operation the rearward tilting movement of the chair seat causes the spindle 21 and the plate members 18—18 to be moved therewith and rotated relatively to the tubular members 14—14 and the flanges 15—15, thus causing the rubber members 17a and 17b to be torsionally twisted to set up gradually increasing tension as the chair seat is tilted rearwardly. During this initial tilting range both the rubber members 17a—17a and 17b—17b are torsionally twisted while during the secondary tilting range only the members 17a—17a are torsionally twisted, the stop lugs 43 engaging the stop screws 44 at the end of the initial tilting range so that the separator plates 42 then move with the plates 48 and no further tension is applied to the rubber members 17b—17b. This tension will preferably be such that the weight of the person seated in the chair seat will be supported in a state of substantial equilibrium at any point of tilt. Upon shifting the weight forwardly the chair seat will be returned to the normal position through the tendency of the rubber members to resume their normal positions. As no lubrication is required the device will remain in perfect working order indefinitely without attention.

With the provision of a plurality of rubber members 17a and 17b, as distinguished for instance from a single rubber member arranged between the flange 15 and the plate member 18, a structure is provided in which the strain will be distributed to the plurality of rubber members rather than to a single member and the possibility of imposing excess strain beyond the elastic limit of the rubber joint is greatly reduced. In this respect therefore the advantages of using the plurality of rubber members may be realized either with or without the initial and secondary tilting range feature, in which latter case the stop screws 44—44 will be dispensed with. As a further embodiment of the invention the rubber bodies 17a and 17b may have different degrees of resistance as for instance by making the rubber body 17b of less density than the rubber body 17a. In this case the rubber body 17b will yield more readily than the rubber body 17a and thereby provide an initial easy tilting range, the rubber body 17a being torsionally twisted as the resistance in the rubber body 17a is built up to a point sufficient to impart twisting strain to the rubber body 17a. This feature may be employed either with or without the stop screws 44—44.

In Fig. 4 I have illustrated a further embodiment in which the tubular member 14a are each provided with a cone-shaped end portion 46 in place of the flange 15 of the embodiments shown in Figs. 1 to 3, and which cooperates with a cone-shaped plate 47 in place of plate 18, an intermediate cone-shaped disk 48 in place of the disk 42, and rubber members 49 and 50 in place of the rubber members 17a and 17b, and which are pressed into cone-shaped cross-sectional shape between the members 46, 47 and 48. Each of the members 48 is provided with an angularly extending lug 51 for cooperation with a stop screw 52 mounted in a bracket 53 in substantially the same relation as the stop screws 44—44 and the lugs 43—43 of the embodiment shown in Figs. 1 to 3. The operation of this embodiment is substantially similar to the operation of the embodiment shown in Figs. 1 to 3, and the same modification described in connection therewith may be resorted to.

In Fig. 5 I have shown the invention as embodied in a tilting back for a chair, as for instance a posture chair. A bracket 54 is secured as by rivets 55 to the rearward ends of the spider arms 10—10, which are secured to the chair seat 11 and is provided with spaced cylindrical bearing portions 56 and with a yoke portion 57 provided at its forward end with a connecting bridge portion 58, the arrangement of the bearing portions 56, the yoke portion 57, and the bridge portion 58 being substantially similar to the arrangement of the bearing portions 29—29, the yoke portion 57 and the bridge portion 58 of the above described embodiments of the invention.

A joint element corresponding to the joint element of any of the above described embodiments of the invention is mounted in the bearing portion 56 and is provided with a tension adjustment lever 30 having a tension adjustment screw 34 for engaging the bridge portion 54 in the same manner as the above described embodiments, the joint element being secured to the sides 59 of the tiltable back supporting frame member 60 by means of the tie-bolt 37 and nut 39, the said sides being provided with apertures 61 for engagement by the tie-bolt and with inwardly embossed locking ribs 62 for locking with the spindle 21 of the joint element. The sides 59 are connected by a stop portion 63 which normally bears against the connecting portion 58 of the bracket to maintain the back in its normal upright position. Upon rearward tilting of the back inclined surfaces 64 provided upon the forward upper edges of the side portions 59 abut the under sides of the spider arms 10 in the rearward tilting limit position.

The chair back 65 is supported upon the tilting frame member 60 for angular adjustment by means of an adjustment screw 66 and for vertical adjustment by means of adjustment screws 67. As these parts do not constitute a feature of the invention they are not described in detail.

I have illustrated and described preferred and satisfactory embodiments of the invention, but it will be obvious that changes may be made therein within the spirit and scope thereof, as defined in the appended claims.

Having thus described my invention what I claim and desire to secure by Letters Patent is:

1. For use in a tilting mechanism including a tiltable member, and a support for said tiltable member supporting said tiltable member for tilting movement about a horizontal axis, and resilient means resisting tilting movement of said tiltable member comprising a pair of relatively rotatable elements disposed in longitudinally spaced relation axially of their axis of rotation, an intermediate separator element disposed in spaced relation between said relatively rotatable elements, and rubber elements between said respective relatively rotatable elements and said separator element bonded respectively thereto and compressed between them, one of said relatively rotatable elements adapted to be rigidly connected with said tiltable member and the other of said rotatable elements adapted to be rigidly connected with said support, whereby upon tilting of said tiltable member there is relatively rotary movement between said tiltable member and said support to tension said rubber elements and means for cooperating between said separator element and said tiltable member for preventing further tension to be applied to one of said rubber elements upon tilting to a predetermined position, further tilting movement beyond said predetermined position adapted to apply further tension to the other of said rubber elements, whereby pressure in excess of a predetermined pressure is only applied to said other rubber element.

2. For use in a tilting mechanism including a tiltable member, and a support for said tiltable member supporting said tiltable member for tilting movement about a horizontal axis, and resilient means resisting tilting movement of said tiltable member comprising a pair of relatively rotatable elements disposed in longitudinally spaced relation axially of their axis of rotation, an intermediate separator element disposed in spaced relation between said relatively rotatable elements, and rubber elements between said respective relatively rotatable elements and said separator element bonded respectively thereto and compressed between them, one of said rubber elements having greater resistance to distortion than the other rubber element, one of said relatively rotatable elements adapted to be rigidly connected with said tiltable member and the other of said rotatable elements adapted to be rigidly connected with said support, whereby upon tilting of said tiltable member there is relatively rotary movement between said tiltable member and said support to tension said rubber elements.

WALTER F. HEROLD.